(12) United States Patent
Siracusano et al.

(10) Patent No.: US 11,870,863 B2
(45) Date of Patent: Jan. 9, 2024

(54) METHOD FOR OPERATING A NETWORK

(71) Applicant: NEC Laboratories Europe GmbH, Heidelberg (DE)

(72) Inventors: Giuseppe Siracusano, Heidelberg (DE); Davide Sanvito, Heidelberg (DE); Roberto Bifulco, Heidelberg (DE); Roberto Gonzalez Sanchez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/909,403

(22) PCT Filed: May 25, 2020

(86) PCT No.: PCT/EP2020/064465
§ 371 (c)(1),
(2) Date: Sep. 5, 2022

(87) PCT Pub. No.: WO2021/239213
PCT Pub. Date: Dec. 2, 2021

(65) Prior Publication Data
US 2023/0100227 A1    Mar. 30, 2023

(51) Int. Cl.
*H04L 12/00*     (2006.01)
*H04L 67/50*     (2022.01)
*H04L 9/40*      (2022.01)

(52) U.S. Cl.
CPC ........ *H04L 67/535* (2022.05); *H04L 63/1408* (2013.01)

(58) Field of Classification Search
CPC ... H04L 67/535; H04L 63/1408; H04L 41/16; H04L 41/5019; H04L 43/062;
(Continued)

(56) References Cited

U.S. PATENT DOCUMENTS

2007/0033263 A1*   2/2007   Goering ............... H04L 45/308
                                                    709/217
2013/0145017 A1*   6/2013   Luna .................... H04W 72/53
                                                    709/224
(Continued)

FOREIGN PATENT DOCUMENTS

CN      108062561 A    5/2018
EP        2073463 A1    6/2009
(Continued)

OTHER PUBLICATIONS

Sun, Qi et al.; "Draft new Supplement ITU-T Y.ML-IMT202-Use-Cases: Machine learning in future networks including IMT-2020: use cases"; *Output of Q20/13 meeting, Geneva, Jun. 28, 2019—ITU-T Draft; Study Period 2017-2020; Study Group 13; Series TD397/WP1*; Aug. 2, 2019; vol. 20/13; XP044269099; International Telecommunication Union; Geneva, Switzerland.

*Primary Examiner* — Frantz Coby
(74) *Attorney, Agent, or Firm* — Leydig, Voit & Mayer, Ltd.

(57)  ABSTRACT

For providing an efficient network use and resource allocation within the network a method for operating a network is provided, wherein user network traffic is controlled by an operator, comprising the following steps: a) monitoring user network traffic data on a per user basis, b) using said network traffic data in a learning process for providing a prediction of user network traffic on a per user basis, and c) controlling user network traffic under consideration of said prediction, including allocating network resources under consideration of said prediction to one or more users, preferably for providing a definable Quality of Service, QoS, per at least ne of said one or more users and/or per at least one other user. Further, a corresponding network is claimed.

22 Claims, 4 Drawing Sheets

(58) Field of Classification Search
CPC ..... H04L 43/0876; H04L 47/10; H04L 47/24; G06N 3/044
USPC .................................. 709/223–226
See application file for complete search history.

(56) References Cited

U.S. PATENT DOCUMENTS

| | | | |
|---|---|---|---|
| 2013/0151649 A1* | 6/2013 | Luna | G06F 15/167 709/213 |
| 2016/0352645 A1* | 12/2016 | Senarath | H04L 41/0896 |
| 2019/0207860 A1* | 7/2019 | York | H04L 43/103 |
| 2019/0238465 A1* | 8/2019 | Das | H04L 45/24 |
| 2020/0213416 A1* | 7/2020 | Carrier | H04L 63/02 |
| 2020/0351201 A1* | 11/2020 | Li | G06F 11/3006 |
| 2021/0352095 A1* | 11/2021 | Cam | G06N 7/01 |

FOREIGN PATENT DOCUMENTS

| | | | | |
|---|---|---|---|---|
| EP | 3633939 A1 * | 4/2020 | ......... | H04L 41/0896 |
| IN | 202241003757 A * | 2/2022 | ......... | H04L 41/0896 |

* cited by examiner

METHOD FOR OPERATING A NETWORK

CROSS REFERENCE TO RELATED APPLICATIONS

This application is a U.S. National Phase application under 35 U.S.C. § 371 of International Application No. PCT/EP2020/064465, filed on May 25, 2020. The International Application was published in English on Dec. 2, 2021, as WO 2021/239213 A1 under PCT Article 21(2).

FIELD

The present invention relates to a method for operating a network, wherein user network traffic is controlled by an operator.

Further, the present invention relates to a corresponding network, wherein user network traffic is controlled by an operator.

BACKGROUND

Methods and networks for operating a network, wherein user network traffic is controlled by an operator, are widely known.

Within such known methods and networks operators, for example Mobile Network Operators, MNOs, and especially Mobile Virtual Network Operators, MVNOs, need to ensure the fairness among users in the usage of the network. Users using applications that generate a large amount of data in small time, i.e. video applications like YouTube or Netflix, p2p applications, data downloads, etc., may affect the experience of other users, in particular those with applications that have stricter quality of service requirements, e.g., low latency or jitter for audio conferences. This happens because existing congestion control mechanisms, such as those implemented by Transmission Control Protocol, TCP, only ensure fairness at the flow-level, without considering the flows aggregated on a per-user basis. Furthermore, TCP fairness is known to be ineffective when network flows traverse network segments with very different properties.

In order to ensure fairness among users, network operators may decide to apply several techniques such as pacing, throttling, etc., on a per-user basis, however, applying those techniques requires investing additional infrastructure resources. This introduces scalability challenges, which make more expensive network operations, e.g., because of the need to add additional hardware to process traffic from all users. Moreover, it is usually difficult to predict the transition of a user from light contributor of network traffic to heavy contributor, i.e., when the user starts generating/receiving large amounts of data. Thus, today operators can only deal with the problem using two approaches: 1) performing continuous traffic shaping for all the users, accepting higher infrastructure and operating costs; 2) reactively shaping traffic from users after a detection of a traffic load increase, which may negatively affect other users' performance.

CN 108062561, for example, shows a short term data stream prediction method based on long short term memory, LSTM, network model.

Further prior art traffic load prediction systems only observe seasonal patterns, e.g. weekly, daily or hourly utilization, to give coarse grained prediction of the future load, on large timescales. This kind of prediction cannot be used to allocate traffic shaping resources which instead have to be allocated in very short time. Said prior art load prediction techniques offer only an average prediction of what will happen in e.g., hours or days.

SUMMARY

In an embodiment, the present disclosure provides a method for operating a network, wherein user network traffic is controlled by an operator, comprising the following steps: a) monitoring user network traffic data on a per user basis, b) using the network traffic data in a learning process for providing a prediction of user network traffic on a per user basis, and c) controlling user network traffic under consideration of the prediction, including allocating network resources under consideration of the prediction to one or more users.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

An embodiment of the present invention improves and further develops a method for operating a network and a corresponding network operator for providing an efficient network use and resource allocation within the network.

In accordance with an embodiment of the invention, the resource allocation within a network is improved by a method for operating a network. In such embodiments, the user network traffic is controlled by an operator, that performs the following steps:

a) monitoring user network traffic data on a per user basis, b) using said network traffic data in a learning process for providing a prediction of user network traffic on a per user basis, and c) controlling user network traffic under consideration of said prediction, including allocating network resources under consideration of said prediction to one or more users, preferably for providing a definable Quality of Service, QoS, per at least one of said one or more users and/or per at least one other user.

Within this document, controlling a network includes pacing, throttling and/or shaping of user network traffic.

Further, the user network traffic is controlled by an operator for providing an efficient network use and resource allocation within the network, comprising:

a) monitoring means which monitor user network traffic data on a per user basis,
b) using means or computing means which use said network traffic data in a learning process for providing a prediction of user network traffic on a per user basis, and
c) controlling means which control user network traffic under consideration of said prediction, including allocating means which allocate network resources under consideration of said prediction to one or more users, preferably for providing a definable Quality of Service, QoS, per at least one of said one or more users and/or per at least one other user.

According to the invention it has been recognized that it is possible to provide an efficient network use and resource allocation within the network by efficiently predicting future traffic load on a per user basis. In a first step user network traffic data is monitored on a per user basis. Then, said network traffic data is used in a learning process for providing a prediction of user network traffic on a per user basis. This learning process results in a prediction which is used in controlling future user network traffic. This controlling includes allocating network resources under consideration of said prediction to one or more users, if necessary, i.e. if a prior or a current allocation is not sufficient for providing an efficient use of the network resources. Thus, the step of allocating network resources comprises maintaining or keeping pending allocations, if under consideration of said prediction an amendment of pending allocations is not necessary. This prediction allows an allocation of network resources for providing an efficient use of the network resources under consideration of the prediction of future traffic load per each user. Thus, a high amount of resources can be assigned to a user expected to need such a high amount of resources. On the other side, a small amount of resources can be assigned to a user expected to need only such a small amount of resources. As a result, a definable QoS per at least one of said one or more users and/or per at least one other user can be provided.

Thus, on the basis of the inventive method an efficient resource allocation within the network is provided.

Embodiments of the present invention are specified in the depending claims.

According to such an embodiment said monitoring step comprises monitoring of network traffic data of current and/or historic network traffic, said network traffic data preferably comprising network flows information about several network entities, preferably hosts, and/or for several days of traffic monitoring. Such data can contain network flow information about several network entities and for several days of traffic monitoring.

According to a further embodiment the learning process comprises machine learning techniques or techniques used in the field of Artificial Intelligence.

Within a further embodiment the prediction of user network traffic comprises short-term user network traffic or short-term user network traffic behavior on a per user basis. Short-term user network traffic or short-term user network traffic behavior provides an efficient and seamless operation of the network.

According to a further embodiment the prediction of user network traffic comprises the prediction of user network traffic generated in at least one defined future time interval or in at least one future time window, preferably on a fine-grained timescale.

Within a further embodiment—on the basis of a current time window—the prediction is provided for the following time window or windows.

According to a further embodiment of the present invention the learning process comprises a learning phase and/or a classification phase, preferably within an offline preprocessing and/or training phase. According to another embodiment the learning process can—alternatively or additionally—be performed within an online phase.

Within a further embodiment, within the learning process a Data Analysis and Split Module, DASM, is used, which takes network traffic data and at least one parameter for tuning the prediction as inputs and which outputs at least one traffic session split into time windows, a corresponding set of labels per each traffic session for classifying each time window in the respective traffic session and traffic window collection parameters for an online prediction phase. Using such at least one parameter is possible to define the timeframe of the traffic prediction, configure the desired time windows splitting method or methods and specify the labels that will be assigned to the traffic time windows.

According to further embodiments a traffic session is split into time windows size based, wherein the sequence of hosts visited by a user is divided into time windows of the same size, or temporal based, wherein each time window contains the end host or end hosts visited in a given interval of time.

According to a further embodiment, within the learning process a Learning Module, LM, is used for training a prediction model for predicting a user network traffic load that a user will generate in at least one defined future time interval or in at least one future time window, preferably in an immediate future.

According to further embodiments the LM takes traffic sessions split into time windows and a corresponding label for each time window as inputs, preferably from the DASM, and/or outputs the prediction model, preferably as a trained Neural Network, NN, model or as a set of rules derived by a trained NN model.

Within a further embodiment, during providing a prediction of user network traffic on a per user basis an online prediction module, OPM, for online predictions is used.

According to a further embodiment the OPM takes a prediction model, preferably the prediction model from the LM, live user network traffic, preferably for feeding the prediction model, and traffic window collection parameters, preferably the traffic window collection parameters from the DASM, as inputs and outputs an user network traffic load of a next time window.

Within a further embodiment said controlling step comprises allocating resources in or by a traffic processing module or the above OPM, wherein this traffic processing module or OPM can be designed to perform traffic controlling, preferably shaping or pacing, only for flows that are assigned label corresponding to a large amount of traffic.

According to embodiments of the invention a method and network or system is provided to predict the users that will generate a large amount of network traffic in a network or network system. These embodiments provide the ability to perform the prediction on the user's following traffic window, e.g., the next considered time interval or time window, given the navigation pattern of the user during the current traffic window, i.e., the currently observed time interval or time window. In fact, decisions on the scheduling of traffic shaping resources according to embodiments of the invention need to take into account what will be the traffic consumption, e.g., in the next few seconds, while prior art load prediction techniques offer only an average prediction of what will happen in e.g., hours or days. Embodiments of the invention are instead tailored to provide predictions of the user's traffic load on a fine-grained timescale, i.e. from 10s of milliseconds to 10s of seconds, which is compatible with the requirements of a traffic shaping scheduler.

Embodiments of the invention allow operators to predict the traffic generated by a user in a given period or to predict the load generated by an user in the next traffic window or time window using as input only the sequence of visited end hosts. The granularity of the prediction, e.g. from 10s of milliseconds to 10s of seconds, allows an operator to allocate correctly and efficiently the limited resources used to perform traffic controlling or shaping, and ensures the desired QoS for each user.

Further embodiments of the invention provide an Artificial Intelligence, AI, assisted method and system or network for intelligent network adaptation or a network or system to provide network traffic pacing, throttling or shaping based on the prediction of the short-term network traffic behavior per user. The network or system can learn the typical behavior of the network users from previously observed traffic and provides a prediction on the short-term behavior of such users' network flows.

Advantages and aspects of embodiments of the present invention are listed as follows:

1) Embodiments of this invention use machine learning model results to allocate resources in a traffic processing module or OPM that performs traffic shaping or pacing only for the flows that are assigned a corresponding to a large amount of traffic.

2) Embodiments of this invention organize sequences of network destinations extracted from network traffic logs in per user sequences, and chunk each of such per user sequences in smaller subsequences or time windows of a configurable size. For each subsequence or time window S, a label is built that corresponds to the amount of data transferred by the subsequence or time window that temporarily follows S. The subsequences or time windows and the labels are used to train a machine learning classifier.

3) Embodiments of this invention extract from the machine learning model the set of network destinations whose presence is the most likely to make the machine learning classifier to predict a label corresponding to a large amount of traffic.

Embodiments of this invention comprise a method for predicting the traffic generated by a user in a given time period. Such embodiments can comprise the following steps:

Preprocessing and training phase, i.e. learning phase:
1) collecting network traffic and extracting contacted network hosts, IP addresses or other destination identifiers and the corresponding traffic load per each user active in the network
2) splitting contacted network hosts, IP addresses or other destination identifiers into chunks, slices or time windows and labeling each chunks, slices or time windows with the generated traffic load
3) feeding the chunks, slices or time windows obtained in this step 2) to a Machine Learning, ML, model that will be trained to predict the traffic load generated in the next chunk, slice or time window
4) extracting a set of rules from the ML model Online traffic analysis and prediction, i.e. using phase:
5) collecting network traffic and extracting contacted network hosts, IP addresses or other destination identifiers per each user active in the network
6) using either the ML model or the set of rules to predict the user traffic load 7) using the information obtained in this step 6) to allocate—or not—resources in a traffic shaper or in the OPM.

Embodiments of methods and networks according to the invention allow network operators to predict the traffic load generated by network users. The fine-grained scale of the prediction allows using the prediction as input of traffic shaping resources schedulers or of the OPM.

Figure 1:
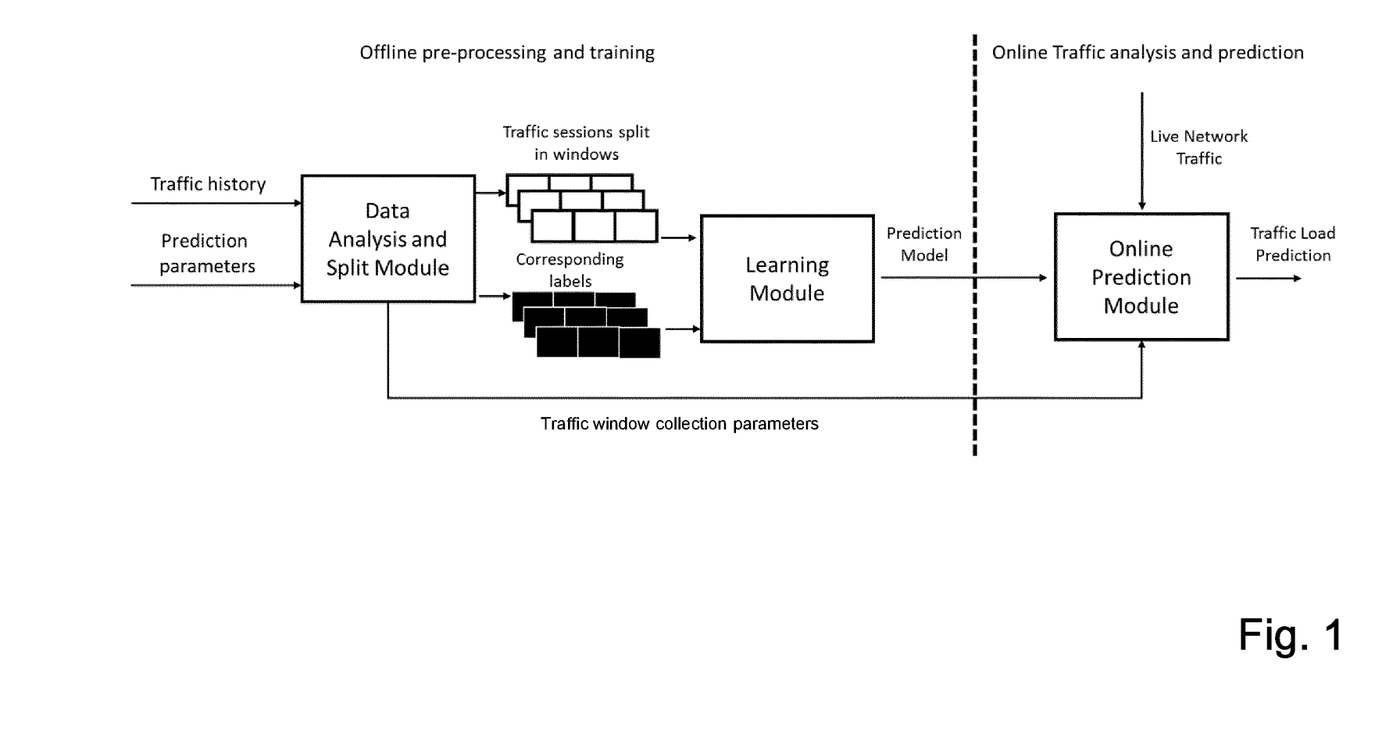
FIG. 1 shows within a diagram system components of a network according to an embodiment of the present invention.

There are several ways how to design and further develop the teaching of the present invention in an advantageous way. To this end it is to be referred to the following explanation of examples of embodiments of the invention, illustrated by the drawing. In the drawing An embodiment of the invention is composed by or comprises three different subsystems or system components as depicted in FIG. 1. FIG. 1 shows said system components and their distinction depending on whether they are used during the learning or classification phases, while the Online Prediction Module, OPM, is used for online predictions.

The Data Analysis and Split Module, DASM, and the Learning Module, LM, are used during the Offline preprocessing and training phase.

The DASM Takes as Inputs:
1. A set of current and/or historical network traffic data. It is assumed that the data is recent, and contains network flows information about several network entities and for several days of traffic monitoring. The actual amount of collected data depends on the deployment scenario and on the desired accuracy of the prediction.
2. A set of parameters used to tune the traffic prediction. Using such parameters is possible to define the time frame of the traffic prediction, to configure the desired time windows splitting methods and to specify the labels that will be assigned to the traffic time windows, e.g.: predict the next Y seconds of traffic, using a fixed time window and labeling as high load traffic time windows that are bigger more than X byte/second or bigger than the X % of the time windows.

Figure 2:
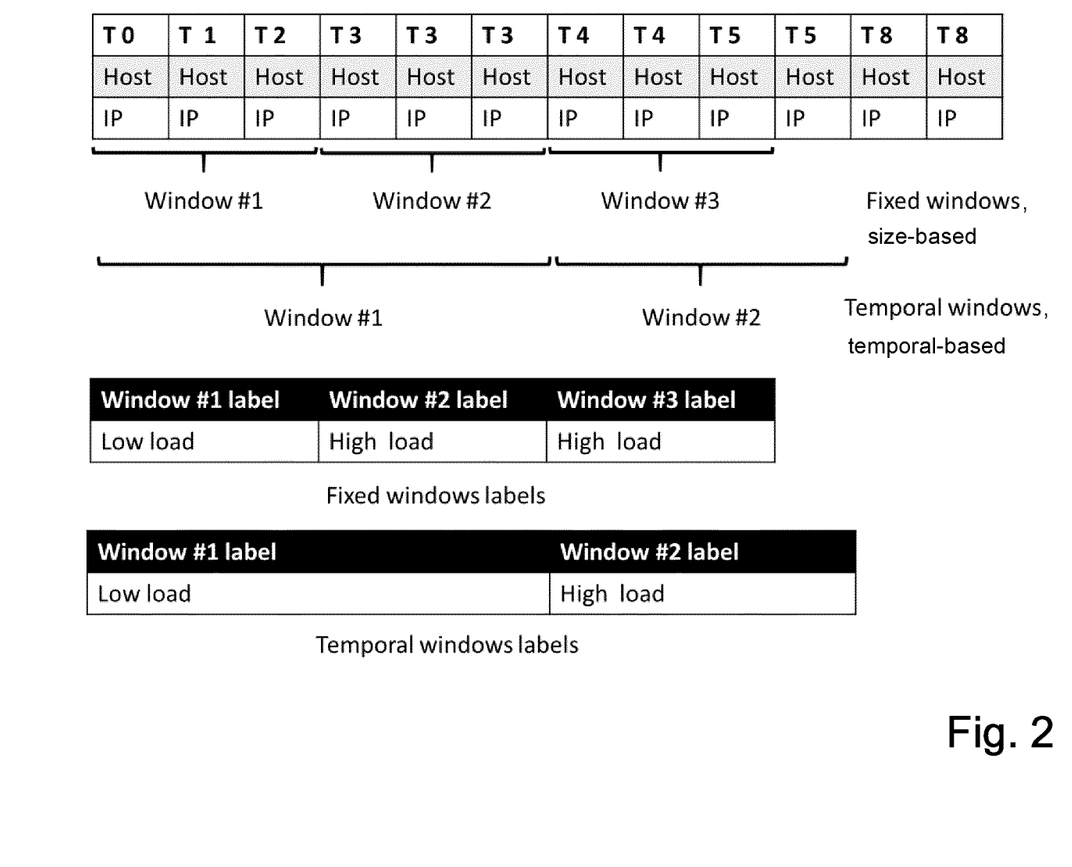
FIG. 2 shows within a diagram traffic window examples and their corresponding labels according to an embodiment of the present invention.

The DASM outputs:
1. A set of traffic sessions organized by users—i.e., a traffic session will contain traffic belonging to a single user—and split into time windows.
2. Per each traffic session the corresponding set of labels used to classify each time window in the session.
3. The traffic window collection parameters that will be then used during the Online Traffic analysis and prediction phase by the OPM to collect live traffic into time windows that will be used to predict the traffic load FIG. 2 shows traffic window examples and their corresponding labels based on two different approaches used to split a user traffic session into time windows: size based or temporal based. When the size based approach is used the sequence of visited hosts is divided into chunks or time windows of the same size, e.g.: 10, 50, 100 contacted end hosts. Instead, when the temporal based approach is used each chunk or time window will contain the end host or end hosts visited in a given interval of time. FIG. 2 also shows the corresponding label, wherein for each time window in the session a label is associated. The label expresses the traffic load of the next time windows in the session.

The DASM Computes the Following Operations:
(1) Divides the historical network traffic trace on a per user basis, i.e., an equal number of traffic traces and users is provided.
(2) Filters out from the historical network traffic traces the information that will be used by the LM, a. sequence of contacted end hosts, IP addresses or other destination identifiers
b. timestamp of the contact
c. associated data transfer size.
(3) Provides a statistical analysis of the filtered network traffic or network traffic information in order to discover the distribution of the inter arrival time between end host requests, per and across users.
(4) The distributions calculated in the previous point are used to divide the filtered traffic traces or network traffic data into traffic sessions, each session should express or expresses a user network activity for a continuous time.
(5) Provides a statistical analysis of the user session in order to discover the distribution of inter arrival window time, time window duration, number of end hosts per time window and network load per each time window.
(6) The distributions calculated in the previous step are used to select a time window size that fits with the input prediction parameters.
(7) Traffic sessions are divided into time windows.
(8) According to the distribution of the network load per time window and input parameters labels for time windows are created, e.g.: high traffic label will be used if the total traffic load is >X otherwise low traffic label will be used.
(9) Time windows are labeled according to the traffic load of the next time window.

The LM trains the prediction model. Machine learning techniques are used to create a prediction model that, given a sequence of visited end hosts by the same user, is capable to predict the traffic load that the user will generate in the immediate future. The prediction model can be directly used in or by the OPM, if such a module supports the execution of Machine Learning, ML, inference, if not, the LM can extract a set of rules from the ML model. These rules will then be used to predict the future traffic load.

The LM takes as inputs:
1. The traffic sessions divided into time windows
2. For each time window the corresponding label The LM Outputs:
1. The Prediction Model. Note that the prediction model, depending on the capability of the OPM, can be outputted as a trained Neural Network, NN, model or as a set of rules derived by a trained Neural Network model.

Figure 3:
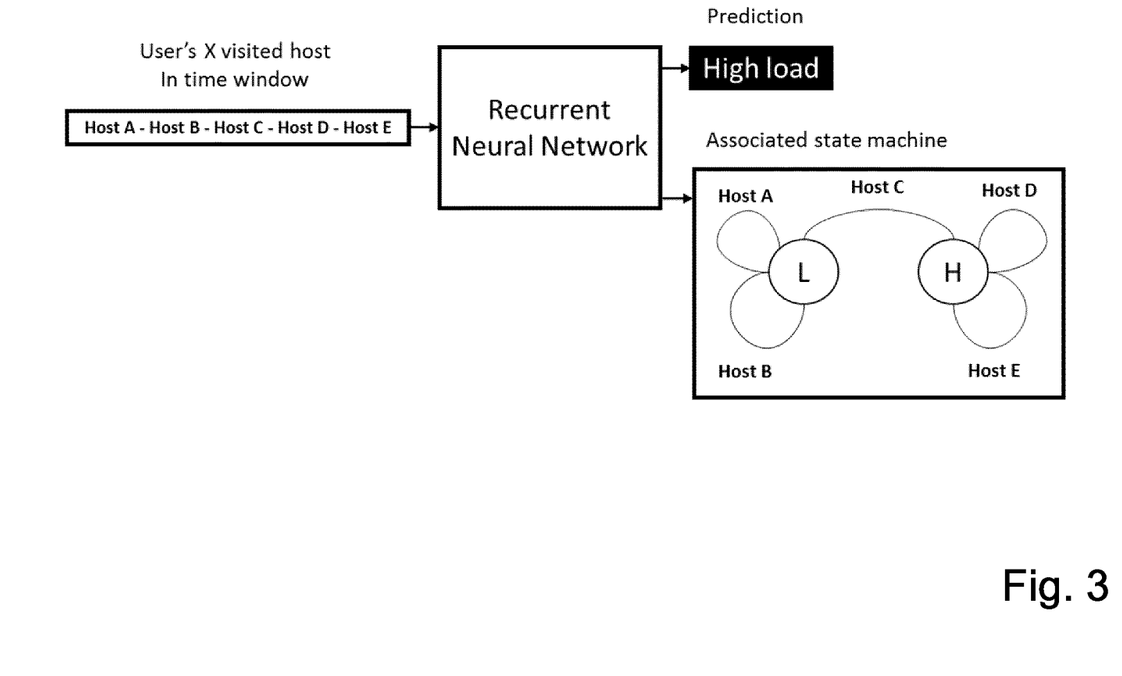
FIG. 3 shows within a diagram input and outputs of a Neural Network used in an LM according to an embodiment of the present invention.

The LM Computes the Following Operations:
1. Uses the sequence of end hosts present in a session to learn a vector representation for each end host present in the traffic session received as input. In order to learn such representation a skip-gram model, e.g. word2vec, or a generic embedding layer can be used.
2. The sequences of vectors in each time window and the corresponding labels are feed to a recurrent Neural Network, e.g.: RNN, LSTM, etc., for the learning phase.
3. The trained model is stored, the trained model at the previous step produces as output not only the prediction of the next time window load, but also a state machine associated with each input sequence.
4. The state machines used at the previous step are analyzed to extract the end host associated with a state change, see FIG. 3.
5. The extracted set of end hosts per each time window is used to derive rules that can directly be applied to predict the load of a or the next time window, e.g.: if the time window contains in sequence Host X and Host Y but not Host Z.

The OPM keeps track of the end host or end hosts visited in the last time window by or per each network user, and feeds this information to the prediction model. The output of the model is a list of users that will have a high traffic load in the next time window.

The OPM Takes as Inputs:
1. Network live traffic
2. The prediction model
3. The traffic window collection parameters The OPM outputs:
1. Traffic load of the next time window, e.g.: High, Medium, Low The OPM computes the following operations:
1. Receives live network traffic.
2. Extracts from the traffic triples of: user, end host, timestamp.
3. Keeps track of each state of each user, of a number of visited end hosts, of a sequence of visited end hosts and of an elapsed time since the start of the time window.
4. Once a time window is full, e.g. the sequence of visited end hosts is equal to the window size or the window time budget is elapsed, or a timer is expired the sequence of end hosts is fed to the prediction model.
5. Executes the prediction model,
a. if the hardware supports NN inference and the time budget to compute the prediction is sufficient, the NN model is used,
b. if the above conditions are not verified the rule based model is executed.

Generally, in this document, particularly in the preceding paragraphs, the term "end host" or "host" can also be understood as or as a synonym of an "IP address" or other identifier of a visited network component.

Figure 4:
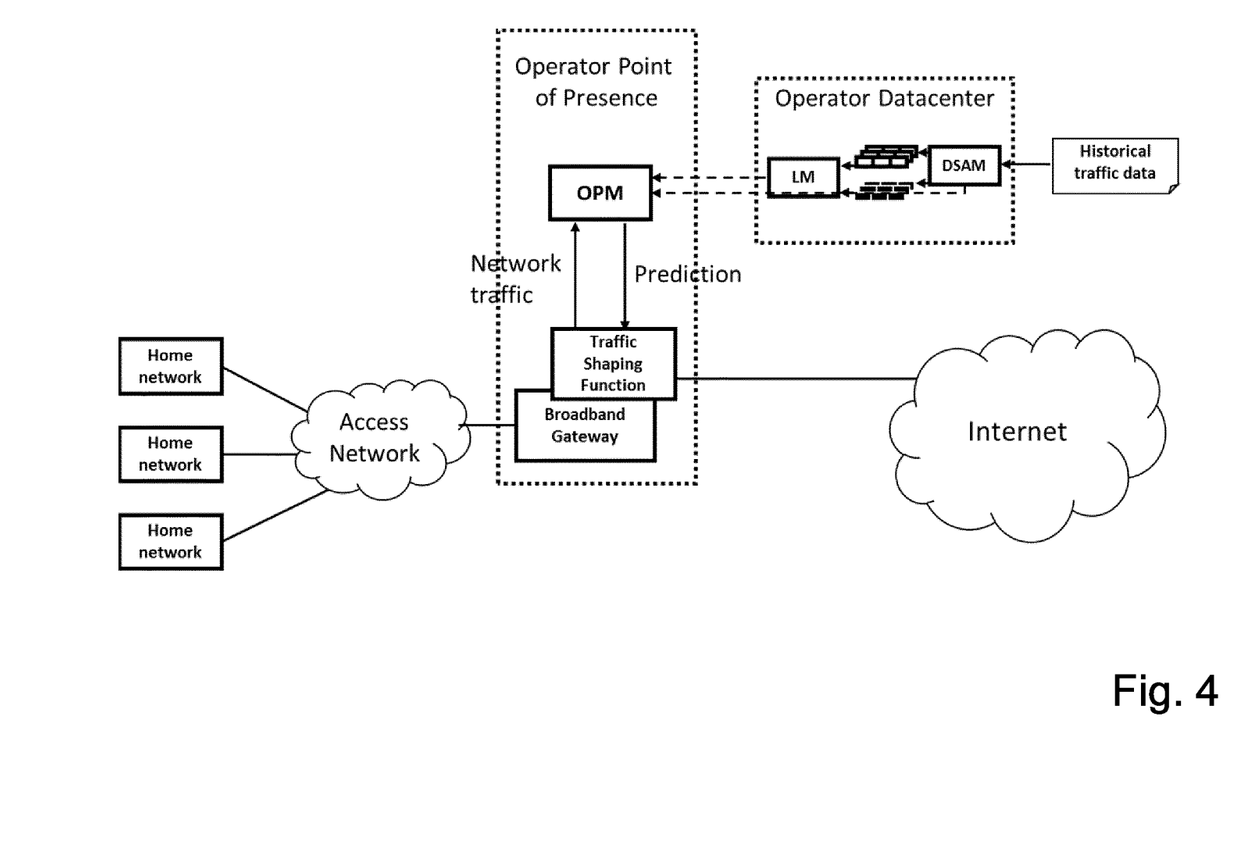
FIG. 4 shows within a diagram implementation details of a network according to an embodiment of the present invention.

Embodiments of the invention can be deployed or used as part of a telecom operator network traffic shaping system, the offline pre-processing and learning modules— DASM and LM— can be deployed into central datacenters where large storage and computation resources are available. While the OPM can be implemented in or co-located with a traffic shaping function, where the prediction outputted by the OPM can be used to proactively allocate per user traffic shaping resources.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a network, wherein user network traffic is controlled by an operator, comprising the following steps:
    a) monitoring user network traffic data on a per user basis,
    b) using the network traffic data in a learning process for providing a prediction of user network traffic on a per user basis comprising:
        determining a sequence of contacted end hosts from the user network traffic data; and
        determining the prediction of user network traffic on the per user basis using the sequence of contacted end hosts, and
    c) controlling user network traffic under consideration of the prediction, including allocating network resources under consideration of the prediction to one or more users.

2. The method according to claim 1, wherein the monitoring step comprises monitoring of network traffic data of current and/or historic network traffic.

3. The method according to claim 1, wherein the learning process comprises machine learning techniques.

4. The method according to claim 1, wherein the prediction of user network traffic comprises short term user network traffic or short term user network traffic behavior on a per user basis.

5. The method according to claim 1, wherein the prediction of user network traffic comprises the prediction of user network traffic generated in at least one defined future time interval or in at least one future time window on a fine-grained timescale.

6. The method according to claim 1, wherein, on the basis of a current time window, the prediction is provided for the following time window or windows.

7. The method according to claim 1, wherein the learning process comprises a learning phase and/or a classification phase.

8. The method according to claim 1, wherein within the learning process, a Data Analysis and Split Module (DASM) is used, which takes the network traffic data and at least one parameter for tuning the prediction as inputs and which outputs at least one traffic session split into time windows, a corresponding set of labels per each traffic session for classifying each time window in the respective traffic session and traffic window collection parameters for an online prediction phase.

9. The method according to claim 8, wherein a traffic session is split into time windows size based, wherein the sequence of contacted end hosts is a sequence of hosts that is visited by a user and is divided into time windows of the same size, or temporal based, wherein each time window comprises the contacted end host or end hosts visited in a given interval of time.

10. The method according to claim 1, wherein within the learning process, a Learning Module (LM) is used for training a prediction model for predicting a user network traffic load that a user will generate in at least one defined future time interval or in at least one future time window in an immediate future.

11. The method according to claim 10, wherein the LM takes traffic sessions split into time windows and a corresponding label for each time window as inputs from a Data Analysis and Split Module (DASM), and/or outputs the prediction model as a trained Neural Network (NN) model or as a set of rules derived by a trained NN model.

12. The method according to claim 1, wherein during providing a prediction of user network traffic on a per user basis, an online prediction module, OPM, for online predictions is used.

13. The method according to claim 12, wherein the OPM takes a prediction model, live user network traffic, and traffic window collection parameters, as inputs and outputs an user network traffic load of a next time window.

14. The method according to claim 1, wherein the controlling step comprises allocating resources in or by a traffic processing module that performs traffic controlling only for flows that are assigned label corresponding to a large amount of traffic.

15. A network for operating a network, wherein user network traffic is controlled by an operator, comprising:
    a) monitoring means which monitor user network traffic data on a per user basis,
    b) using means or computing means which use the network traffic data in a learning process for providing a prediction of user network traffic on a per user basis comprising:
        determining a sequence of contacted end hosts from the user network traffic data; and
        determining the prediction of user network traffic on the per user basis using the sequence of contacted end hosts, and
    c) controlling means which control user network traffic under consideration of the prediction, including allocating means which allocate network resources under consideration of the prediction to one or more users.

16. The method according to claim 1, wherein the controlling step is performed as to provide a definable Quality of Service, QoS, per at least one of the one or more users and/or per at least one other user.

17. The method according to claim 2, wherein the network traffic data comprises network flows information about several network entities and/or for several days of traffic monitoring, wherein the several network entities indicate the contacted end hosts.

18. The method according to claim 7, wherein the learning phase and/or the classification phase is within an offline pre-processing and/or training phase.

19. The network according to claim 15, wherein the controlling means is configured for providing a definable Quality of Service, QoS, per at least one of the one or more users and/or per at least one other user.

20. The method according to claim 1, wherein determining the sequence of contacted end hosts comprises inputting the user network traffic data into a Data Analysis and Split Module (DASM) to determine the sequence of contacted end hosts, and
    wherein determining the prediction of user network traffic on the per user basis using the sequence of contacted end hosts comprises inputting the sequence of contacted end hosts into a learning model (LM) to determine the prediction, wherein the prediction is a prediction model.

21. The method according to claim 20, wherein the prediction model is a neural network (NN) or a set of rules derived by a trained NN, and wherein the sequence of contacted end hosts indicates internet protocol (IP) addresses or other identifiers associated with visited network components.

22. The method according to claim 20, wherein determining the prediction of user network traffic is based on using only information associated with the sequence of contacted end hosts, and wherein controlling the user network traffic under consideration of the prediction comprises controlling the user network traffic using the prediction model that was determined based on the sequence of contacted end hosts.

* * * * *